(12) United States Patent
Bearden et al.

(10) Patent No.: US 6,550,061 B1
(45) Date of Patent: Apr. 15, 2003

(54) SYSTEM AND METHOD FOR MODIFYING CONFIGURATION FILES IN A SECURED OPERATING SYSTEM

(75) Inventors: Brian Bearden, Austin, TX (US); Quentin Groves, Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/453,765

(22) Filed: Dec. 2, 1999

(51) Int. Cl.$^7$ ............................................. G06F 9/445
(52) U.S. Cl. .................. 717/174; 717/174; 717/176; 707/203
(58) Field of Search ................... 717/121, 168, 717/169, 174, 176, 171, 100, 120, 170, 172, 173, 177, 178; 707/203, 511

(56) References Cited

U.S. PATENT DOCUMENTS

| | | | | |
|---|---|---|---|---|
| 5,966,540 A | * | 10/1999 | Lister et al. | 717/174 |
| 6,105,033 A | * | 8/2000 | Levine | 707/101 |
| 6,209,089 B1 | * | 3/2001 | Selitrennikoff et al. | 713/2 |
| 6,216,175 B1 | * | 4/2001 | Sliger et al. | 717/169 |
| 6,226,747 B1 | * | 5/2001 | Larsson et al. | 713/200 |
| 6,237,144 B1 | * | 5/2001 | Delo | 717/174 |
| 6,262,726 B1 | * | 7/2001 | Stedman et al. | 345/745 |
| 6,269,480 B1 | * | 7/2001 | Curtis | 717/106 |
| 6,272,674 B1 | * | 8/2001 | Holiday, Jr. | 717/174 |
| 6,279,155 B1 | * | 8/2001 | Amberg et al. | 717/174 |
| 6,327,705 B1 | * | 12/2001 | Larsson et al. | 717/174 |
| 6,327,706 B1 | * | 12/2001 | Amberg et al. | 717/174 |
| 6,353,926 B1 | * | 3/2002 | Parthesarthy et al. | 717/170 |
| 6,360,365 B1 | * | 3/2002 | Curtis | 717/169 |
| 6,374,401 B1 | * | 4/2002 | Curtis | 717/175 |
| 6,381,742 B2 | * | 4/2002 | Forbes et al. | 717/176 |

OTHER PUBLICATIONS

Kim et al, "The design and implemenation of tripwire: a file system interity checker", ACM CCS, pp. 18–29, 1994.*

Hall et al, "A Cooperative approach to support software deployment using the software dock", ACM ICSE, pp 174–183, 1999.*

* cited by examiner

*Primary Examiner*—Anil Khatri
(74) *Attorney, Agent, or Firm*—Hamilton & Terrile, LLP; Stephen A. Terrile

(57) ABSTRACT

A computer system and method modifies operating system files via a self-deleting background process that downloads to a user's desktop and bypasses operating system securities. The background process modifies operating system files including configuration files in a registry via a downloadable desktop component. A method for a computer system having a registry includes installing a background process, bypassing computer operating system securities for the registry via the background process, modifying the registry via the background process, and removing the background process. The method further includes providing a desktop component related to an executable file that executes when the user selects the desktop component. Following the execution of the executable file, the method includes modifying configuration files including registry keys and automatically removing the executable file, the desktop component and files associated with the executable file. A computer system includes a processor coupled to a bus, at least one memory coupled to the bus, a plurality of input/output devices coupled to the bus, and an operating system stored in memory, the operating system including a registry of configuration files, operating system securities for the registry, the operating system securities preventing modification of the registry according to a permissions system, a self-deleting background process, wherein the background process bypasses the operating system securities for the registry via the background process, and the background process modifies configuration files in the registry. The computer system also includes a self-deleting executable file including a utility file that installs the self-deleting background process.

22 Claims, 9 Drawing Sheets

SYSTEM AND METHOD FOR MODIFYING CONFIGURATION FILES IN A SECURED OPERATING SYSTEM

BACKGROUND OF THE INVENTION

1. Field of the Invention

This field relates to software, and, more particularly to a system and method for altering a Windows-type registry.

2. Description

Computer systems have attained widespread use for providing computer power to many segments of today's modem society. A personal computer system can usually be defined as a desk top, floor standing, or portable microcomputer that includes a system unit having one or more system processors and associated volatile and non-volatile memory, a display monitor, a keyboard, one or more diskette drives, a fixed disk storage device and an optional printer. One of the distinguishing characteristics of these systems is the use of a system board to electrically connect these components together. These personal computer systems are information handling systems which are designed primarily to give independent computing power to a single user (or a group of users in the case of personal computers which serve as computer server systems) and are inexpensively priced for purchase by individuals or small businesses.

A personal computer system may also include one or a plurality of I/O devices (i.e. peripheral devices) which are coupled to the system processor and which perform specialized functions. Examples of I/O devices include modems, sound and video devices or specialized communication devices. Mass storage devices such as hard disks, CD-ROM drives and magneto-optical drives are also considered to be peripheral devices.

Manufacturers of personal computers often pre-install an operating system, such as the Microsoft Windows NT™ operating system, the Microsoft Windows 2000™ operating system, or the IBM OS/2™ operating system. These modem operating systems are increasingly large in terms of both complexity and storage requirements, often requiring several hundred megabytes of hard drive space. When a manufacturer installs an operating system, the manufacturer may use another computer to copy an image of the operating system from a separate hard drive onto the target hard drive being created, or the manufacturer may install the operating system on each machine sold.

Whether copying an image of a hard drive or installing the operating system on each customer system, changing the configuration of a customer's system once the system has been sold to the customer to provide customizations is a lengthy technical procedure.

One part of an operating system that a customer may desire customizing or editing that is present on some Windows-type operating systems is the registry.

Long after a computer system is sold it may be discovered that a registry key needs to be deleted or edited. However, security systems within the operating systems can prohibit a computer user from resolving the problems associated with the registry keys. For example, a computer user may be a network user who is working on a computer system connected to a network. The security system in Windows NT prevents certain users from accessing each registry key. In order to delete or edit a problem registry key, a user with Administrator privileges must follow difficult and highly technical steps. Often, a call to the manufacturer technical support is necessary to complete the task of removing registry keys.

What is needed is an efficient system and method of editing registry keys from a Windows NT or similar Windows operating systems.

SUMMARY

A computer system and method modifies registry keys via a self-deleting background process that downloads to a user's desktop and bypasses operating system securities. The background process modifies configuration files in a registry via a downloadable desktop component. A method for a computer system having a registry includes installing a background process, bypassing computer operating system securities for the registry via the background process, modifying the registry via the background process, and removing the background process. The method further includes providing a desktop component related to an executable file that executes when the user selects the desktop component. Following the execution of the executable file, the method includes modifying configuration files including registry keys and automatically removing the executable file, the desktop component and files associated with the executable file.

A computer system includes a processor coupled to a bus, at least one memory coupled to the bus, a plurality of input/output devices coupled to the bus, and an operating system stored in memory, the operating system includes a registry of configuration files, operating system securities for the registry, the operating system securities preventing modification of the registry according to a permissions system, a self-deleting background process, wherein the background process bypasses the operating system securities for the registry via the background process, and the background process modifies configuration files in the registry. The computer system also includes a user-activated desktop component that is related to an executable file that installs the self-deleting background process. The executable file removes the user-activated desktop component after the configuration files are modified. The computer system also includes a self-deleting executable file including a utility file that installs the self-deleting background process.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
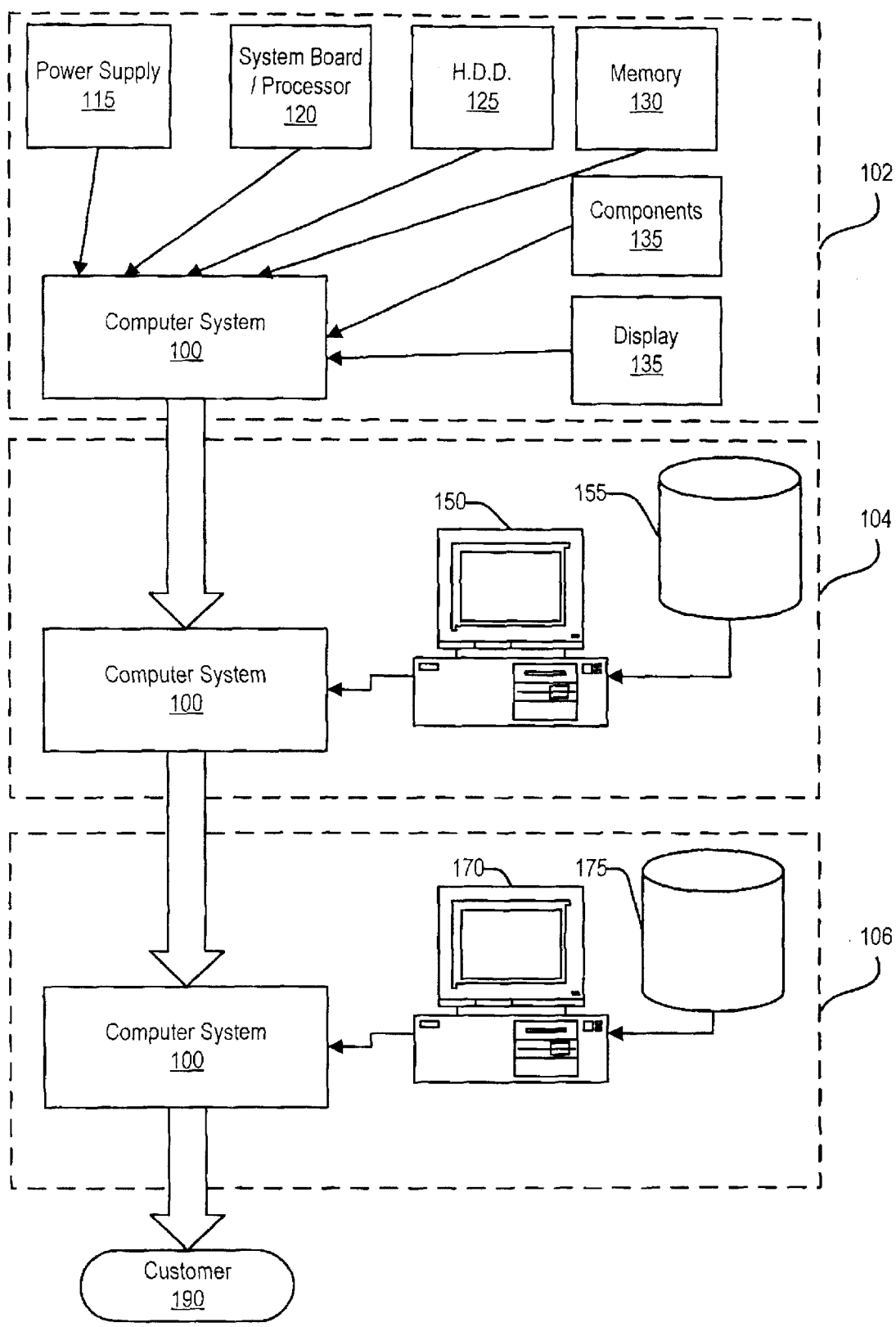
FIG. 1 is a block diagram showing an installation of a computer operating system in accordance with the present invention.

A personal computer manufacturing process is shown in FIG. 1. Computer system 100 is first assembled at hardware manufacture section 102 with various hardware components including a power supply 115, a system board with a processor 120, nonvolatile storage 125, and memory 130. Additional components 135 may also be installed and may include items such as a tape drive, a compact disk read-only-memory (CD-ROM), as well as other components that may have been ordered by the customer. Nonvolatile storage device 125 may be a hard disk drive or any device that holds information when the computer system is powered off.

After the hardware of computer system 100 is installed, computer system 100 is transferred to software installation section 104. During software installation section 104, a standard operating system and applications are installed by manufacturing computer system 150. Manufacturing computer system 150 either reads disk images or copies install programs from a factory server 155. Disk images or the install programs are stored onto a nonvolatile storage device by various means known by those skilled in the art. Manufacturing computer system 150 may also install selected components from software products to further customize computer system 100. Software packages and suites, such as Microsoft Office™, contain several software applications. In the case of Microsoft Office™, the suite contains a word processor (Microsoft Word™), a spreadsheet (Microsoft Excel™), a database (Microsoft Access™), a presentation application (Microsoft Powerpoint™), and a personal information manager (Microsoft Outlook™). Customers may request that any one or more of such applications from the suite be installed onto computer system 100. Manufacturing computer system can also be used to install such applications onto computer system 100. Computer system 100 is powered up and assists in the installation process and may also execute installation programs to install applications onto nonvolatile storage device 125. The operator of manufacturing computer system 150 may be a person or an automated program which determines which disk image or install programs should be installed to the nonvolatile storage device 125 previously installed in computer system 100.

To customize computer system 100, a generic installation program and modified configuration files may be stored on and loaded onto the nonvolatile storage device 125 previously installed in computer system 100.

As will be appreciated by those skilled in the art, disk images or install programs on server 155 and custom components 175 may be stored on the same nonvolatile storage device. In addition, a local area network (LAN) may be used to connect manufacturing system 150 and custom installation system 170 to nonvolatile storage devices containing disk images and install programs from server 155 and custom components 175.

Figure 2:
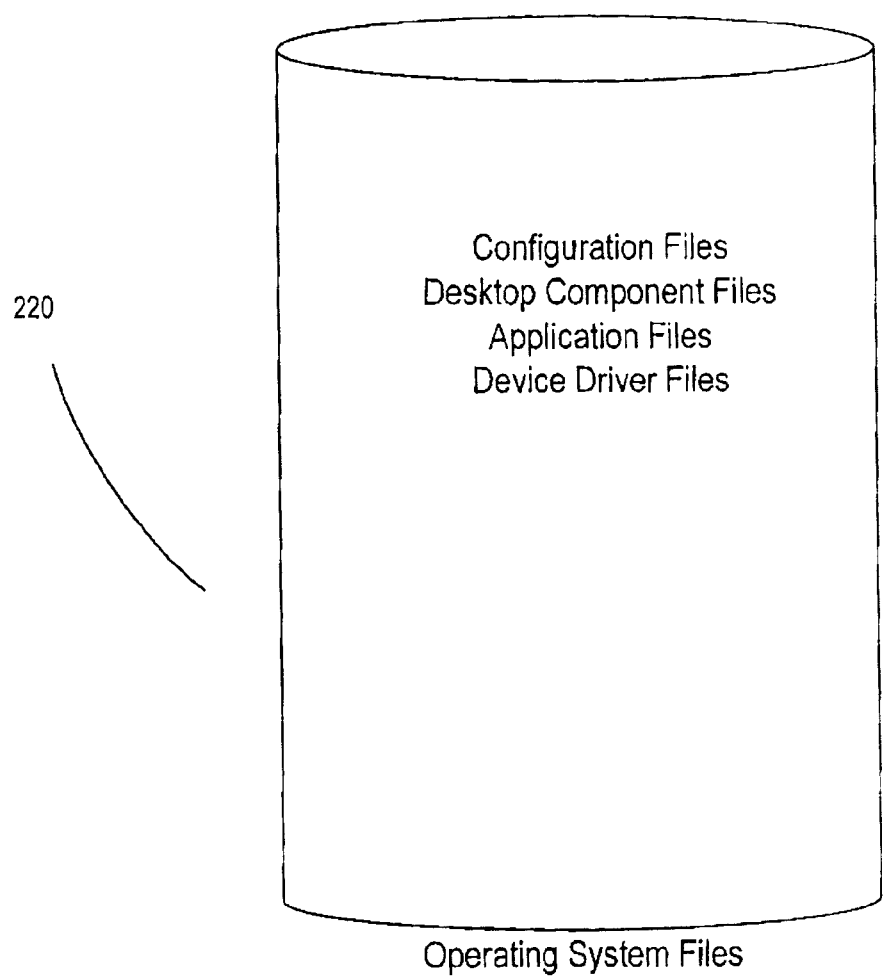
FIG. 2 is a block diagram showing the operating system files that are modifiable according to an embodiment of the present invention.

FIG. 2 shows operating system files 220 that are modifiable using an embodiment of the present invention. Included in the files are configuration files, desktop component files, application files and device driver files.

Figure 3:
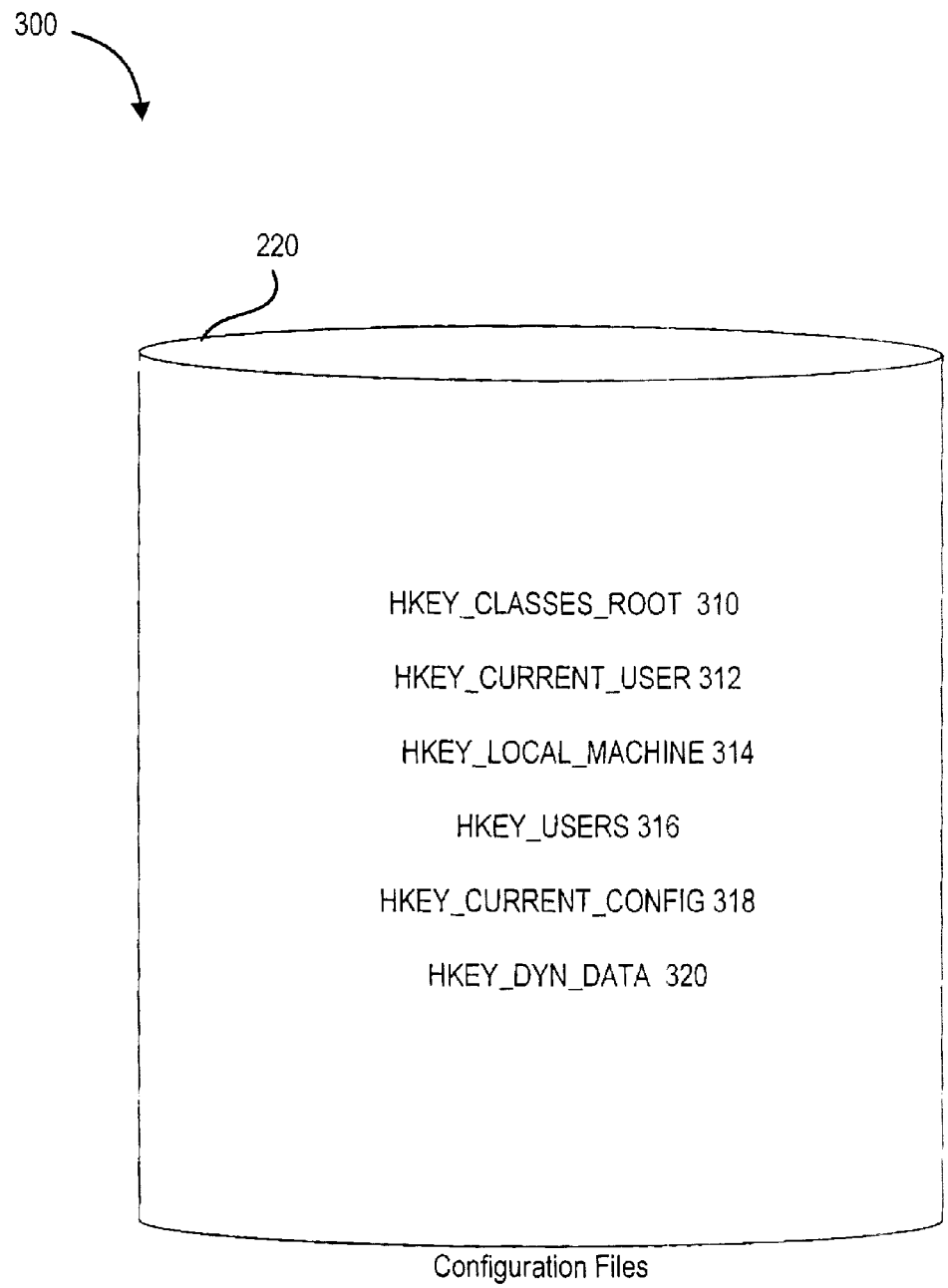
FIG. 3 is a diagram of configuration files within a registry according to the present invention.

FIG. 3 shows a detailed view of operating system 220 configuration files. In some operating systems, such as Windows 95™ and Windows NT™, the configuration files of operating system files 220 form a registry for storing configuration information. The registry in Windows NT contains configuration information as hidden SYSTEM.DAT and USER.DAT files. These files automatically change whenever a user makes configuration changes via the Control Panel or when the registry is directly edited. The registry contains six divisions, each beginning with "HKEY_". The HKEY stands for a programming "handle" to a "key", or division. The divisions include "HKEY_CLASSES_ROOT" 310, "HKEY_CURRENT_USER" 312, "HKEY_LOCAL_MACHINE" 314, "HKEY_USERS" 316, "HKEY_CURRENT_CONFIG" 318, and "HKEY_DYN_DATA" 320. The registry organizes the six divisions hierarchically so that each HKEY contains subkeys and sub-subkeys etc. A utility called a "registry editor" (regedit.exe) is included with Windows 95™ and Windows NT™ for viewing the keys and subkeys. Windows NT™ provides a newer registry editor in addition to regedit.exe, i.e., regedt32.exe.

Figure 4:
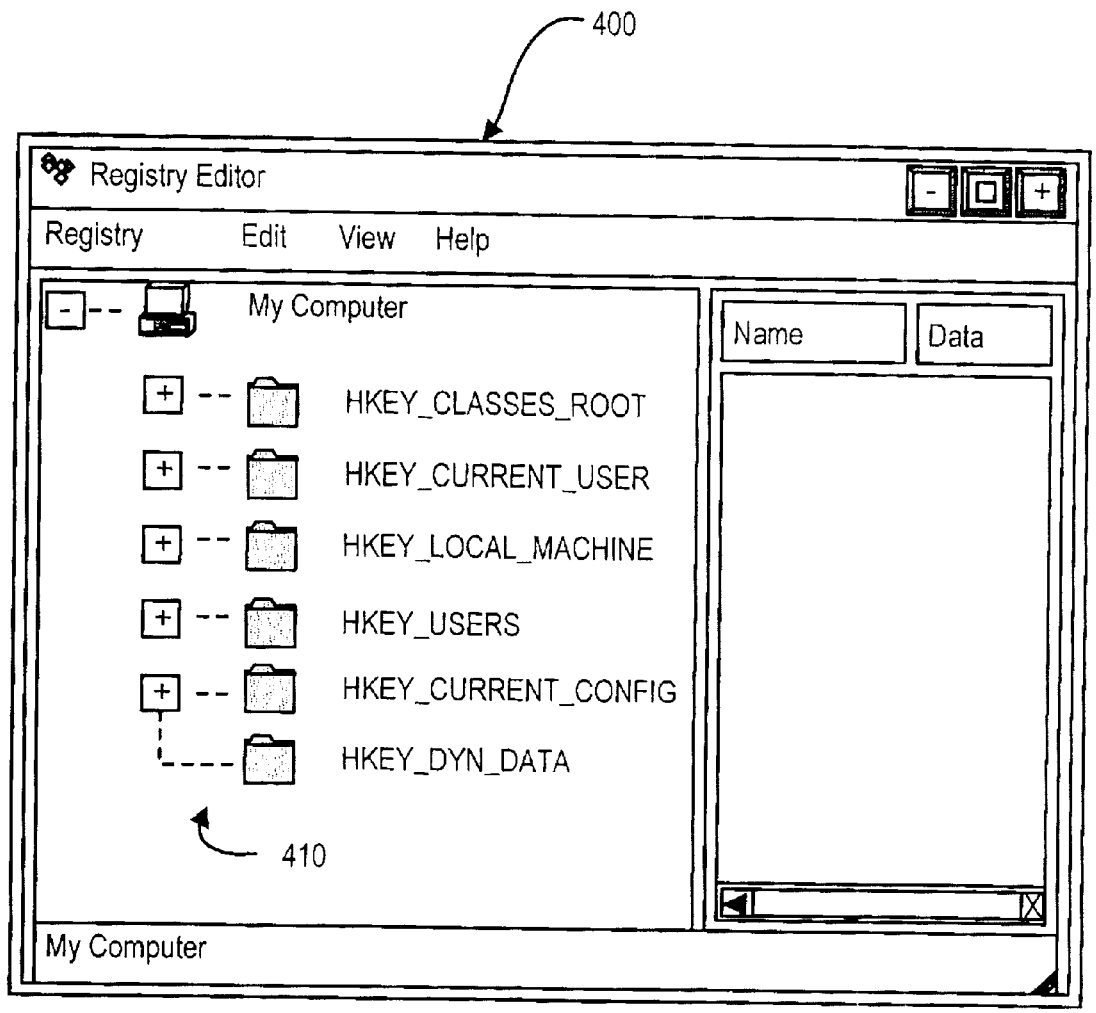
FIG. 4 is a flow chart shows a registry editor for a computer operating system in accordance with the present invention.

FIG. 4 shows an example of a registry editor 400 for a Windows95 or later operating system. As shown, the registry editor 400 appears as a list of "folders" 410 and resembles the application "Windows Explorer™."

Figure 5:
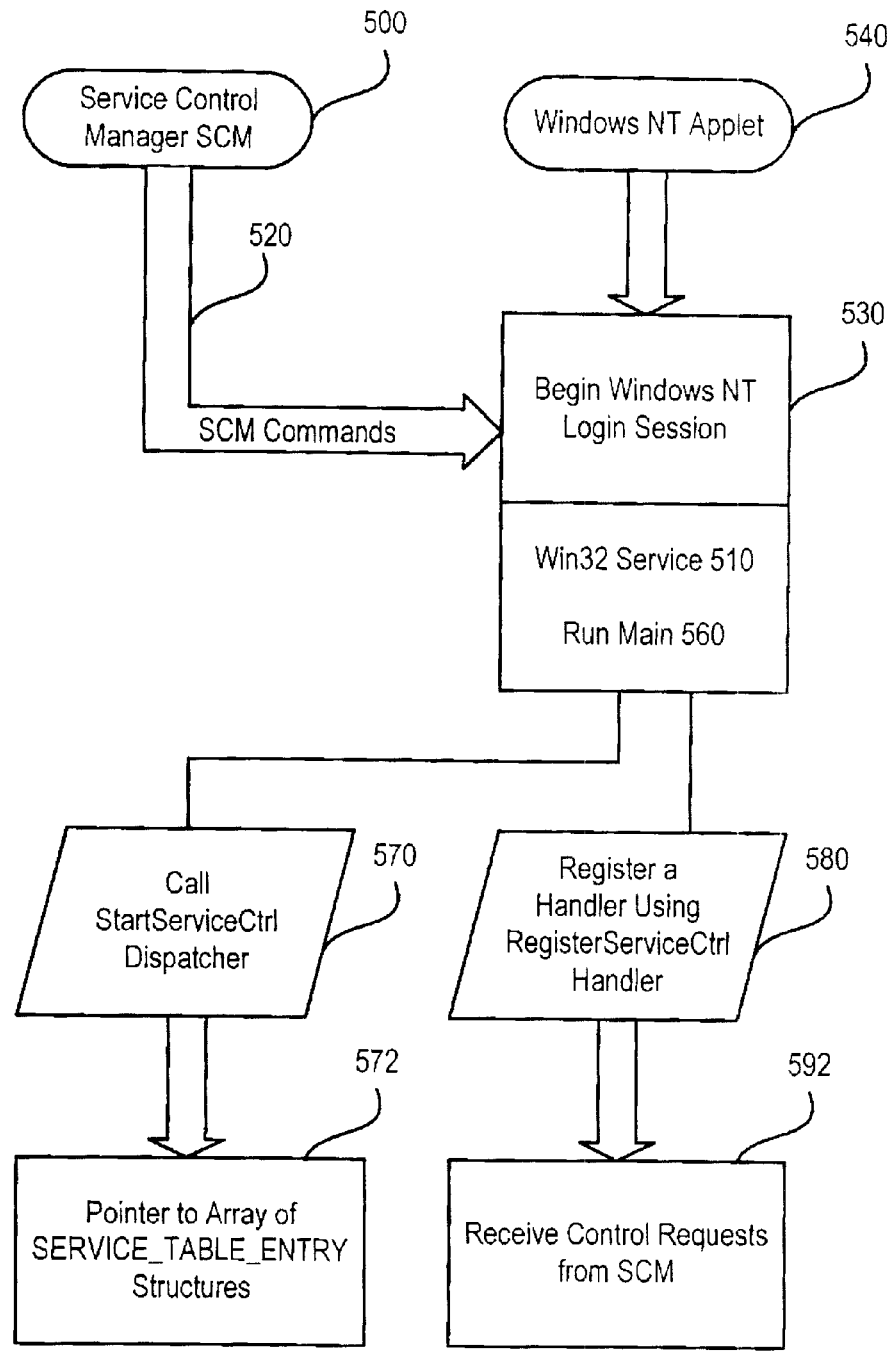
FIG. 5 is a flow chart showing the operating of services with a service control manager according to the present invention.

Referring now to FIG. 5, a registry in Windows NT and some similar systems implements a Service Control Manager (SCM) 500. The SCM 500 manages and operates Win32 services 510. A Windows NT service is a 32 bit executable (Win32) service 510 that is a background process run as an executable controlled by the SCM 500, registered with the SCM 500 and capable of responding to SCM commands 520. Additionally, a Win32 service 510 has its own NT login session 530 or can share a login session with another service 510. Often, a Win32 service 510 is loaded by the SCM 500 at bootup and operates independently without requiring a user to be logged in. Optionally, a Win32 service 510 is capable of manual launch by a user using, for example, a Windows NT applet 540 or other program that interfaces with the SCM 500.

Background processes typically run with services include hardware drivers and hardware applications, server applications, and communication and database software 550. Win32 services are either graphical user interface (GUI) type applications or console type applications.

Each Win32 service 510 includes a "main ( )" function 560 that registers the service so that the SCM 500 will start the service at an appropriate time.

More specifically, the main() function 560 registers the service with the SCM 500. One method of registering a service is calling the function StartServiceCtrlDispatcher( ) 570 which has a single parameter that is a pointer to an array of SERVICE_TABLE_ENTRY structures 572. Alternatively, a Win32 API (Application Programmers Interface) function 580 RegisterServiceCtrlHandler( ) registers a handler( ) function with the SCM 500. The function calls service control requests 592 and the main( ) function 560 starts a thread that performs a service function. The handler( ) function receives control requests from the SCM 500. Typical control requests 592 include:

(SERVICE_CONTROL_STOP); (SERVICE_CONTROL_PAUSE); (SERVICE_CONTROL_CONTINUE); (SERVICE_CONTROL_INTERROGATE); and (SERVICE_CONTROL_SHUTDOWN).

Typically, user requests concerning a service are passed through the SCM and parameters are placed in the service area of the registry. Each service alters registry subkeys or values in a designated key such as registry key,
HKEY_LOCAL_MACHINESYSTEM\CurrentControl\SetServices\<Name>.

In systems with Windows NT or similar systems, the access to the registry and the SCM is controlled through a security system. The Windows NT system, in particular, includes built-in privileges such as an administrative level privilege and a system level privilege. The system level privilege is the broadest level and the administrative level privilege is the second broadest level of privileges. The administrative level privilege allows administrators to create users and to define privileges for individual users at different privilege levels.

In order to delete any problem registry keys, a user must follow difficult and highly technical steps. Often, a call to the manufacturer's technical support is necessary to complete the task of removing registry keys.

Figure 6:
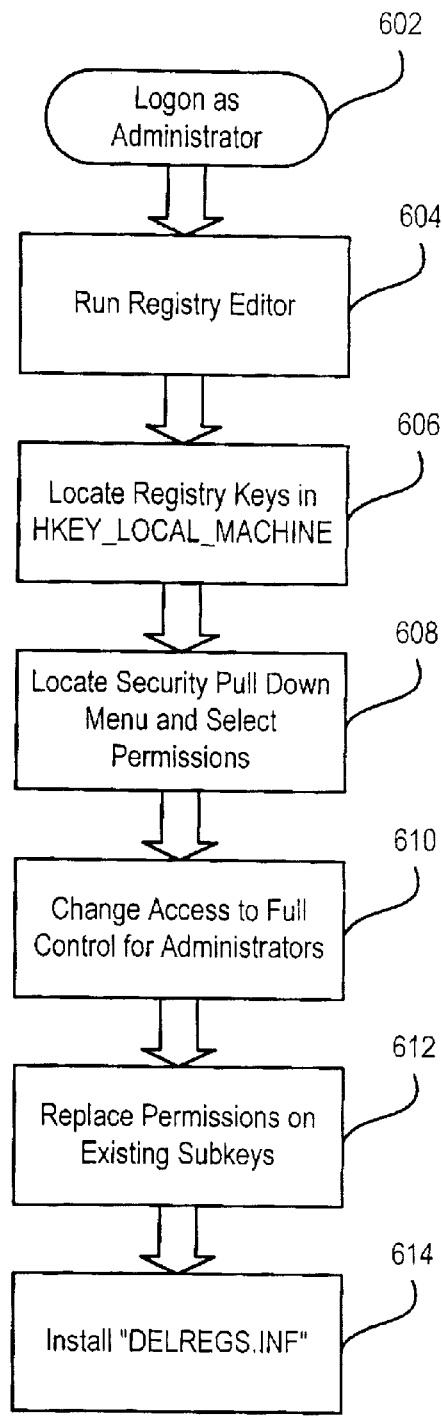
FIG. 6 is a flow chart showing an alternate method for altering registry keys in accordance with the present invention.

Referring to FIG. 6, a procedure 600 for deleting registry keys is shown that requires Administrator privileges. According the procedure, a user must logon as an Administrator 602, run a Windows registry editor application, such as regedt32.exe 604. Next, the user must locate a title bar for HKEY_LOCAL_MACHINE and click the title bar with a mouse 606, double-click on SYSTEM, double-click on CurrentControlSet; double-click on Enum; and single-click on Root. The user must then open a pull-down menu for Security and select Permissions 608. Within the Permissions window, a registry Key Permissions window includes an Add button. The Add button is used to change access to full control for administrators 610. The user selects the Add button and an Add Users and Groups dialog box displays. The user selects Administrators and another Add button. Next, the user copies the username "Administrator" to the bottom panel of the window. The user then selects a "Type of Access" dialog box, selects "Full Control" and closes the window by selecting "OK". A resulting checkbox "Replace Permission on Existing Subkeys" appears as well as an "OK" button to select for replacing the permission on all existing subkeys 612. A change in permissions then allows a user to use Windows NT Explorer to locate and select a delregs.inf file. By installing the deiregs.inf file, any keys in the registry that need to be deleted are removed 614.

There are several problems associated with the above-described procedure. First, the entire procedure requires Administrator-level privileges or higher to implement any part of the procedure. Second, there are numerous technical steps required to accomplish the task.

Figure 7:
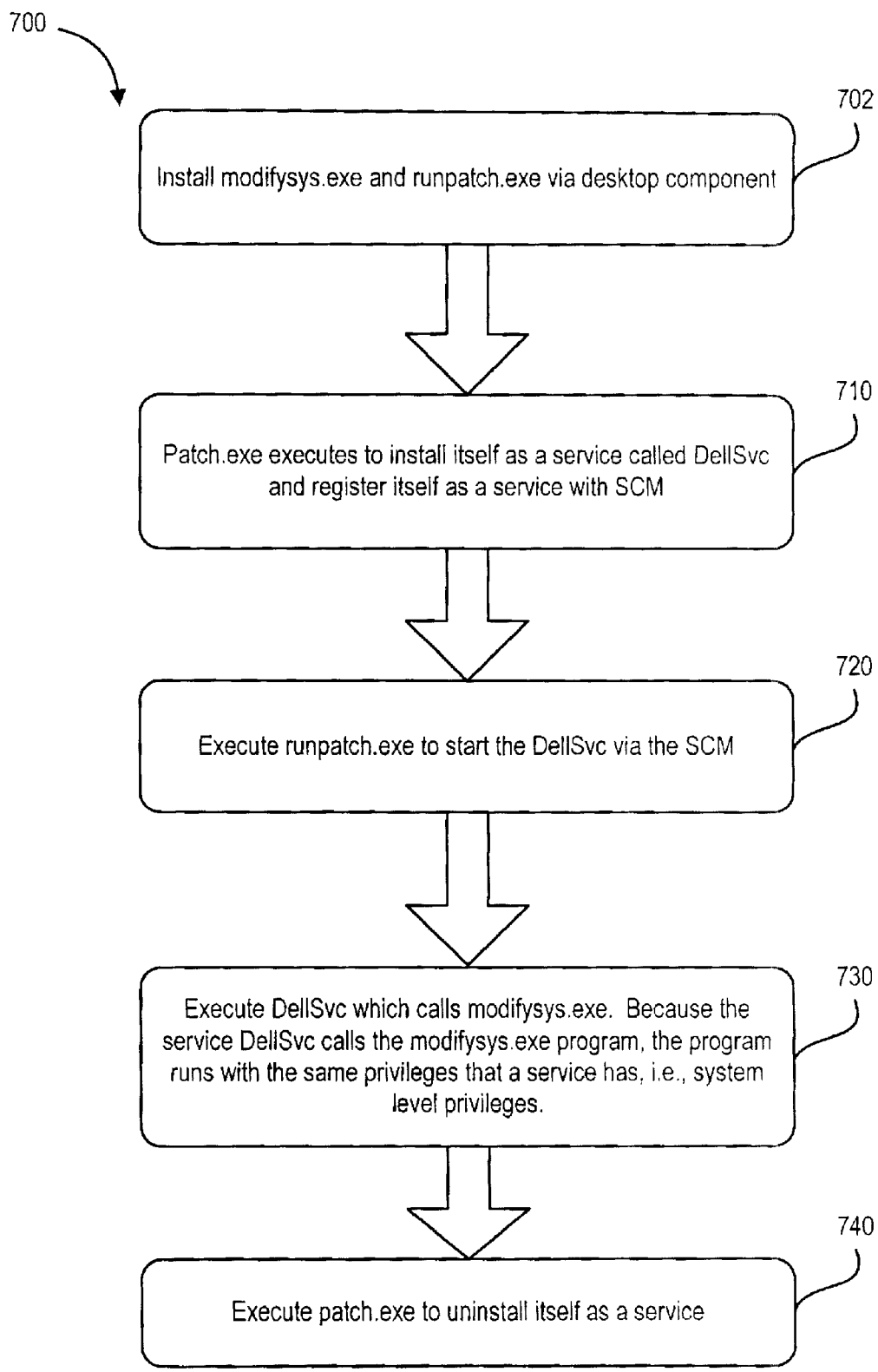
FIG. 7 is a flow chart showing a method of altering registry keys in a registry according to an embodiment of the present invention.

Referring now to FIG. 7, a flow diagram 700 illustrates a method according to an embodiment of the present invention. As shown in step 702, the components modifysys.exe and runpatch.exe are installed. The installation is accomplished via a user clicking on an icon that was previously installed on the operating system, or that was downloaded from a network. In step 710, the component patch.exe executes and installs itself as a service (DellSvc) and registers itself as a service with the SCM. Referring to step 720, runpatch.exe executes and starts DellSvc via the SCH. The SCM then launches "DellSvc", which calls the modifysys.exe component as part of step 730. More specifically, DellSvc executes, calling the modifysys.exe program. Because the service DellSvc calls the modifysys.exe component, the service runs with the same privileges that a service has, i.e., system level privileges and performs the modifications to the registry.

Referring to step 740, component patch.exe executes and uninstalls itself as a service. More specifically, the DellSvc is removed and all service files are removed from the system.

The procedure outlined in flow diagram 700 is capable of being contained in a "patch" application that performs the steps of installing the application as a service, running the service and uninstalling the service. Under one embodiment, the "patch" contains two executable files. One file contains a service executable that functions as a service, deleting or editing registry keys directly as well as installing and uninstalling itself. The second executable file contains a "runpatch" executable, which is a program launched by the user that communicates with the SCM to launch the service executable, monitors the progress of the service, exits when the service is complete, and deletes the service files.

Figure 8:
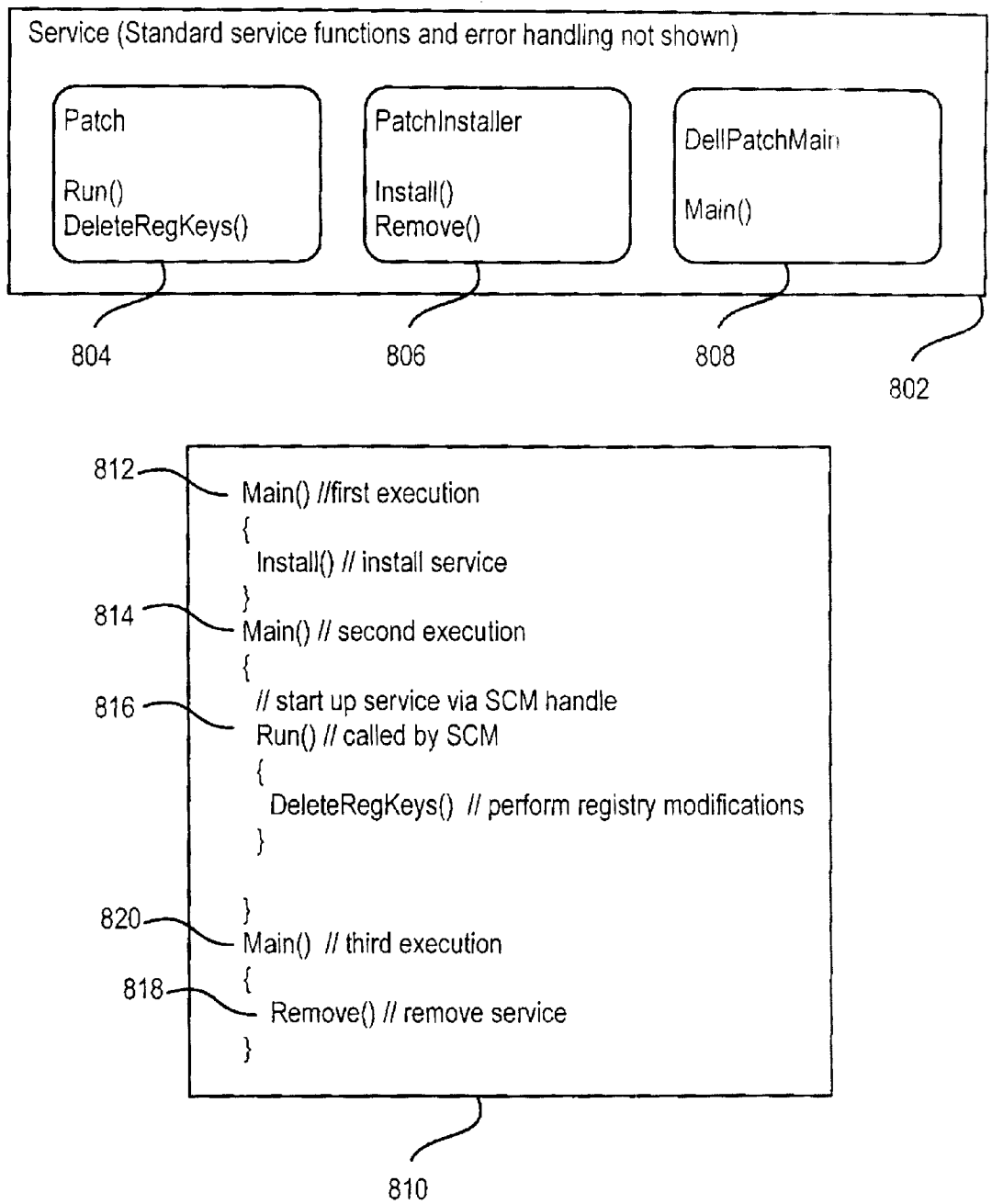
FIG. 8 shows pseudo code for the method of altering registry keys according to the present invention.

More specifically, still referring to FIG. 7, the patch.exe executable contains three individual components shown in FIG. 8: Patch Installer, DellPatchMain, and patch. The combination of the three components making up patch.exe first installs itself as a service. This service runs component modifysys.exe program as one of its actions. The program bypasses securities to allow modification of registry keys that have "system" level permissions. Step 730 includes editing keys within the registry, including deleting keys that are unnecessary for a particular user with administrator privileges. Step 740 refers to uninstalling DellSvc by running patch.exe and deleting all patch files included in the three individual programs described above from the operating system.

Referring to FIG. 5, FIG. 7 and FIG. 8 in combination, step 710, the runpatch.exe component contacts the SCM 500 and requests that DellSvc be run. The DellSvc uses patch.exe as its service executable. More specifically, the SCM 500 runs the program patch.exe to run DellSvc. When the SCM 500 send the run command 520 to the DellSvc, the service will launch patch.exe and call a run ( ) function 808. Main 560 represents the component of the service shown in FIG. 8, 808. Main 560 optionally runs a workspace file such as a file written using Microsoft® Developer Studio software. Also, as one skilled in the art will appreciate, the programs and utilities described herein can be written as a C++ program or another appropriate programming language for Windows NT or Windows 2000.

Referring to FIG. 8, pseudo code for the present invention is shown. As shown, the Windows NT service is shown in 802 as having three parts: "Patch" 804, "PatchInstaller" 806 and "DellPatchMain" 808. The pseudo code in 810 shows the execution of "main", which runs a first execution 812 that installs the service, the service is a Windows NT service that is capable of operating under system level security permissions. The second execution of "main" 814 starts the service installed by the first execution 812. The service is started via a service control manager (SCM) handle and is called by the SCM at "run" 816. The "run" command 816 performs the registry modifications. The final execution of main 820 performs a clean-up procedure in which all aspects of the patch.exe program are deleted including the removal 818 of the service. Accordingly, the patch.exe program is capable of being executed by a user with administrative level permissions and capable of using system level privileges to modify the registry.

One skilled in the art will appreciate that the patch.exe can be installed by an administrator which has no system level permissions, and perform registry operations and editing despite the lack of permissions to do so. The patch.exe component is capable of being installed on an administrator's system via a computer network or a local LAN and being run by simply clicking on the program at the command line or, alternatively, by clicking on icon keys.

Figure 9:
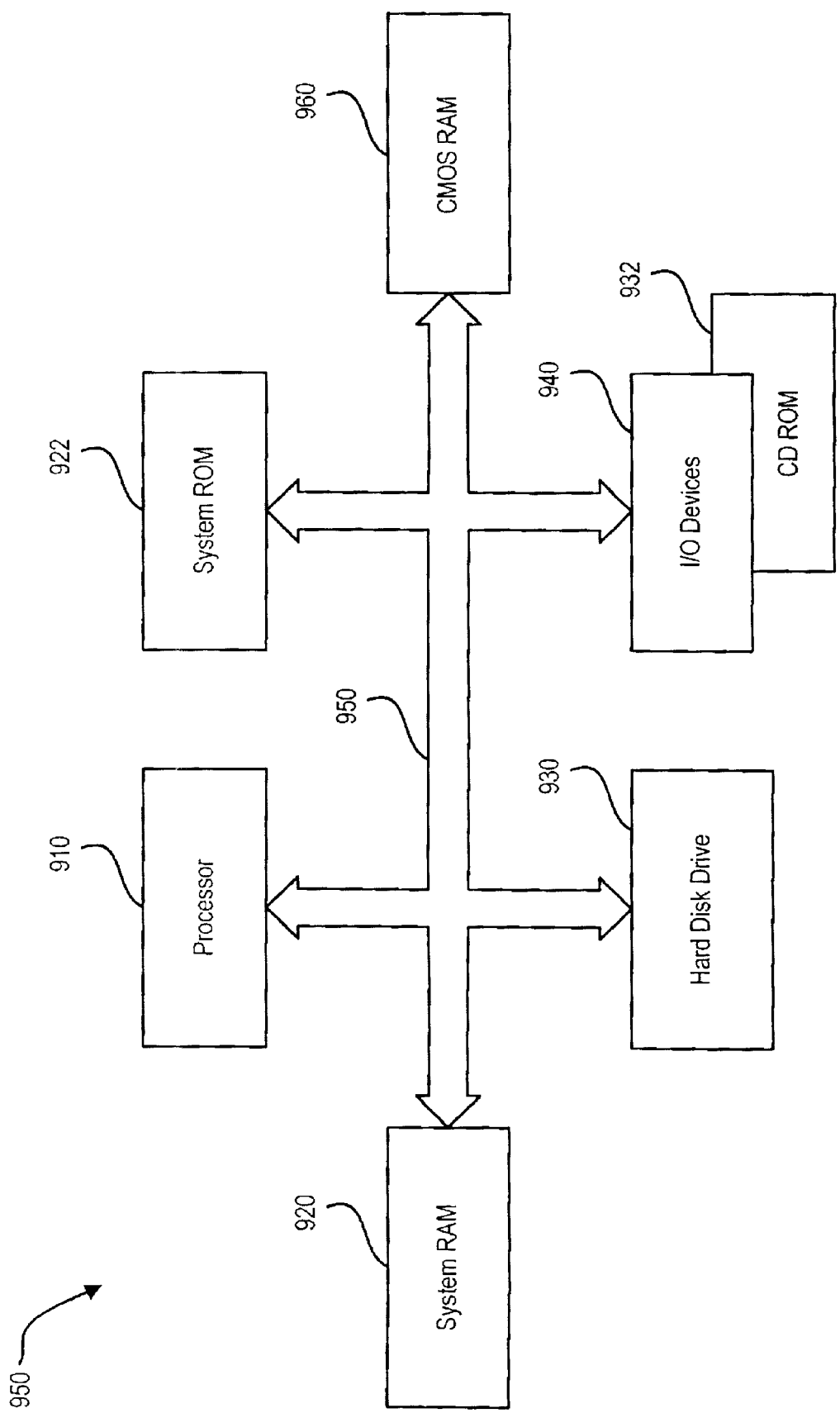
FIG. 9 shows a computer system capable of implementing an embodiment of the present invention.

Referring to FIG. 9, a block diagram shows computer system 900 that is suitably configured for the embodiments of the present invention. The computer system 900, typically a personal computer, includes a processor 910, a system random access memory (RAM) 920, a system ROM 922, a CD-ROM drive 932, and various other input/output devices 940. The computer system 900 is shown to include a hard disk drive 930 connected to the processor 910 although some embodiments do not include the hard disk drive 930. Optionally, computer system 900 includes a bootable operating system compact disk (CD) for use with a computer system with or without a hard disk drive installed and formatted. Such a CD is useful when the computer system 900 either does not include a hard disk drive 930 or the hard disk drive 930 does not have an operating system, for example the Windows NT operating system, installed on the hard disk drive 930.

The processor 910 communicates with the system components via a bus 950 which includes data, address and control lines. A CMOS clock nonvolatile RAM 960, which is connected to the processor 910 via the bus 950, is typically utilized to store information even when power to the computer system 900 is interrupted. Program instructions that make up the system for modifying registry keys are stored in a storage device such as the hard disk drive 930 or the system ROM 922 connected to the processor 910. The processor 910, for example a Pentium™ processor, executes the computing operations of the computer system 900.

Although the invention has been described with reference to various embodiments, it will be understood that these embodiments are illustrative and that the scope of the invention is not limited to them. Many variations, modifications, additions and improvements of the embodiments described are possible. Those skilled in the art will readily implement the steps necessary to provide the structures and methods disclosed herein, and will understand that the process parameters are given by way of example only and can be varied to achieve the desired structure as well as modifications which are within the scope of the invention. For example, although files with the extension .exe are described, one of ordinary skill in the art will appreciate that other file types are within the scope of the invention, such as .inf files and .vbs files. Variations and modifications of the embodiments disclosed herein may be made based on the description set forth herein, without departing from the scope and spirit of the invention as set forth in the following claims.

In the claims, unless otherwise indicated the article "a" is to refer to "one or more than one."

What is claimed is:

1. A method for a computer system having an operating system and a registry for computer system configuration, the method comprising:
    installing a background process;
    bypassing operating system securities via the background process;
    modifying the operating system via the background process;
    removing the background process; and,
    downloading a self-deleting executable file, the self-deleting executable file including a utility file that installs the background process.

2. The method of claim 1 wherein:
    the bypassing operating system securities via the background process allows a user with administrator privileges to execute systems level modifications.

3. The method of claim 1 wherein:
    the operating system securities include securities for the registry; and
    the modifying the operating system includes modifying registry keys within the operating system.

4. The method of claim 1 further comprising:
    installing a user-activated desktop component that is related to an executable file that installs the background process.

5. The method of claim 4 wherein the executable file removes the user-activated desktop component after the configuration files are modified.

6. The method of claim 4 wherein the user-activated desktop component is downloaded from a computer network.

7. The method of claim 1 wherein the modifying the operating system includes modifying configuration files in the registry.

8. The method of claim 1 wherein the background process is a service.

9. The method of claim 1 wherein the operating system is a Windows NT™ type operating system.

10. The method of claim 1 wherein the background process is a service, the service further including:
    a module that modifies the registry;
    a module that installs a utility file and removes the utility file; and
    a module that interacts with a service control manager.

11. A computer system comprising:
    a processor coupled to a bus;
    at least one memory coupled to the bus;
    a plurality of input/output devices coupled to the bus;
    an operating system stored in memory, the operating system including:
       a registry of configuration files;
       operating system securities for the registry, the operating system securities preventing modification of the registry according to a permissions system; and
    a self deleting background process, wherein the background process bypasses the operating system securities via the background process, and the background process modifies the operating system, the self deleting background process including a self-deleting executable file, the self-deleting executable file including a utility file that installs the self-deleting background process.

12. The computer system of claim 11 wherein the background process bypasses the securities for the registry and the background process modifies registry keys within the configuration files of the registry.

13. The computer system of claim 11 further comprising:
    a user-activated desktop component that is related to an executable file that installs the self-deleting background process.

14. The computer system of claim 13 wherein the executable file removes the user-activated desktop component after the configuration files are modified.

15. The computer system of claim 13 wherein the user-activated desktop component is downloaded from a computer network.

16. The computer system of claim 11 wherein the configuration files in the registry include registry keys.

17. The computer system of claim 11 wherein the self-deleting background process is a service.

18. The computer system of claim 11 wherein the operating system is a Windows NT™ type operating system.

19. The computer system of claim 11 wherein the self-deleting background process is a service, the service further including:

a module that modifies the registry;

a module that installs a utility file and removes the utility file; and a module that interacts with a service control manager.

20. A system comprising:

means for bypassing computer operating system securities via a self-deleting background process; and means for modifying operating system files via the self-deleting background process, the self deleting background process including a self-deleting executable file, the self-deleting executable file including a utility file that installs the self-deleting background process.

21. The system of claim 20 wherein:

the operating system files include registry keys; and the operating system securities include securities for configuration files including the registry.

22. The system of claim 20 wherein the system is a program product and the program product further comprises:

signal bearing media bearing said means for bypassing computer operating system securities for a registry via a self-deleting background process and said means for modifying configuration files in the registry via the self-deleting background process.

* * * * *